(12) United States Patent
Bragulla et al.

(10) Patent No.: US 6,382,136 B1
(45) Date of Patent: May 7, 2002

(54) METHOD FOR TREATING THE HOOVES OF MAMMALS ESPECIALLY CATTLE

(75) Inventors: Siegfried Bragulla, Monheim (DE); Gilbert Bardoneschi, Bassu (FR); Alain Collin, Issy-les Moulineaux cedex (FR); Hubert De Roquefeuille, St. Germain de la Grange (FR)

(73) Assignee: Henkel Ecolab GmbH & Co. oHG, Dusseldorf (DE)

( * ) Notice: Subject to any disclaimer, the term of this patent is extended or adjusted under 35 U.S.C. 154(b) by 0 days.

(21) Appl. No.: 09/831,967

(22) PCT Filed: Nov. 6, 1999

(86) PCT No.: PCT/EP99/08528

§ 371 Date: Jul. 9, 2001

§ 102(e) Date: Jul. 9, 2001

(87) PCT Pub. No.: WO00/28917

PCT Pub. Date: May 25, 2000

(30) Foreign Application Priority Data

Nov. 17, 1998 (FR) .............................. 98 14392

(51) Int. Cl.⁷ ................................. A01K 7/00
(52) U.S. Cl. ................. 119/650; 119/656; 119/664
(58) Field of Search ................. 119/650, 652, 119/656, 658, 664, 665, 666, 667, 669, 600, 601, 602, 603, 604; 168/48

(56) References Cited

U.S. PATENT DOCUMENTS

| 3,108,574 | A | | 10/1963 | Albers |
| 4,126,104 | A | | 11/1978 | Overby |
| 4,334,504 | A | * | 6/1982 | Matthews .................... 119/159 |
| 4,987,861 | A | * | 1/1991 | Lemire et al. .............. 119/159 |
| 5,630,379 | A | * | 5/1997 | Gerk et al. .................. 119/667 |
| 5,774,909 | A | * | 7/1998 | Stable ............................ 4/662 |

FOREIGN PATENT DOCUMENTS

| EP | 0 497 062 | 8/1992 |
| FR | 1 081 555 | 12/1954 |
| GB | 1 388 676 | 3/1975 |

\* cited by examiner

*Primary Examiner*—Peter M. Poon
*Assistant Examiner*—Bethany L. Griles
(74) *Attorney, Agent, or Firm*—Merchant & Gould P.C.

(57) ABSTRACT

A method is provided for treating the foot or hooves of animals used for breeding that are kept in sheds, especially cattle and particularly dairy cattle. The method is characterized in that in a first phase, the feet or hooves of the animals are cleaned with water or a detergent containing soap or tensides, using an automatic spray system in order to remove all traces of excrement, especially manure or other dirt, for example straw, and then in a second phase, the previously cleaned feet or hooves are treated with a disinfectant by wetting or spraying.

30 Claims, No Drawings

METHOD FOR TREATING THE HOOVES OF MAMMALS ESPECIALLY CATTLE

The present invention relates to a method for treating the hooves of animals used for breeding, especially cattle, in particular animals used for breeding which are kept in a barn. Cattle, but also sheep, goats and horses used for breeding frequently suffer from hoof diseases, in particular as a result of inflammations of viral or bacterial origin between the ends of the hoof or digits; these inflammations, which are extremely painful, cause lameness or difficulties in moving, as a result of which the animal stops eating normally and this reduces its milk yield.

Consequently, these diseases caused by disease-transmitting microorganisms give rise to serious problems for breeders, particularly since they can be transmitted from one animal to another.

It should be pointed out that these problems are relatively rare in grazing animals which move over extensive soft surfaces; they occur to a greater extent if the animals are kept continuously in a barn, in particular in a so-called "free" barn. In these barns, the animals move freely in a restricted space delimited by concrete and also by gratings, in other words by an unnatural floor consisting of concrete slats which are separated from one another by slots, are laid over a pit used for disposing of the manure.

It will be appreciated that particularly hard surfaces of this type cannot be kept in a perfect hygienic state, so the animals inevitably stand and wade in dirt and, in particular, in their own excrement.

These living conditions and the physical and mechanical consequences of the constant movement of the animals on very hard ground, cause constant irritation in the hoof region; this is manifested by softening of the horny layer in the end region of the hoof, in other words by brittleness, and this opens up a door to inflammatory diseases caused by the very large number of pathogens on the ground on which the animals are moving.

As already mentioned, these inflammations which are manifested, in particular, by abscesses between the hoof ends are very painful and lead to extreme sensitivity to touch, and this makes it extremely difficult to treat inflamed regions topically, in particular when applying antibiotics to the skin.

Therefore, the only possible method of treatment is oral administration of antibiotics; it is found, however, that a treatment of this type becomes less and less effective, owing to the increasing resistance of the pathogens found in the dirt to the various antibiotics.

To overcome these drawbacks, methods aimed at prevention rather than a cure have already been proposed for treating the hooves of animals used for breeding, in particular cattle,.

With these methods, the animals to be treated are made to walk through foot tanks, i.e. large, shallow tanks filled with disinfectant baths. These baths generally consist of highly concentrated solutions of formaldehydes combined with copper sulphate. They generally contain about 10% of formaldehyde and 2% of copper sulphate. In these solutions, the formaldehyde acts as disinfectant whereas the copper sulphate has the object of strengthening the horn of the animals' hooves to make them less sensitive to physical and mechanical irritation caused by the hardness of the surface on which they are moving.

However, these baths have proven to be unsatisfactory. In fact, they are foul-smelling and highly irritating to the skin, owing to their high concentration of formaldehyde, and pollute the environment owing to the considerable quantities of copper sulphate.

The main drawback of these known treatment baths, however, resides in their inadequate microbicidal activity. The animals actually introduce a large amount of protein-containing dirt into the bath as they pass through the foot bath; the formaldehyde accordingly reacts preferentially with this organic waste, at the expense of the concurrent reaction to destroy the pathogens, and therefore rapidly becomes ineffective.

It is mentioned, for the sake of completeness, that foot baths with antibiotics have already been proposed. However, extensive use of these foot baths cannot be seriously considered as the tanks have to be emptied periodically in order to renew the treatment baths, so considerable quantities of antibiotics, which are proven to pollute the environment, are released into the open countryside.

The object of the present invention is to overcome these drawbacks with a method for treating the hooves of animals used for breeding, especially cattle, in particular dairy cows which are kept in a barn, the method being sufficiently effective to solve the aforementioned problems of inflammation in the region of the hoof ends, without irritating the skin and at the same time without polluting the environment.

According to the invention, this object is achieved with a method which is characterised in that, in a first stage, the animals' hooves are cleaned with water or a different soap- or surfactant-containing cleaning product using an automatic spray system, to remove all traces of excrement, in particular manure or other dirt, for example, from the straw and, in a second stage, the previously cleaned animals' hooves are treated by wetting or spraying with a disinfectant.

The basic idea of the invention is therefore to avoid the rapid deactivation of the disinfectant in the treatment bath due to organic dirt adhering to the animals' hooves by removing this dirt in a prior cleaning stage before application of the disinfectant.

This cleaning obviously has to be carried out automatically. Manual cleaning is undesirable owing to the time required by staff and to the sensitivity to touch of the animals' hooves.

For this purpose and according to a preferred feature of the invention, during the cleaning stage, the animals to be treated are passed through a cleaning passageway comprising, at least on one side, but preferably on both sides, spray ramps equipped with a row of spray nozzles with which respective jets of water or cleaning product can be directed at predetermined pressure directly onto the hooves of the animals to be treated.

According to the invention, therefore, the cleaning stage is carried out in a cleaning passageway which is so arranged that the animals to be treated have to pass through it.

This passageway, which has a length of about 1 to 10 m, is preferably limited at the sides by two vertical walls and enclosed, on either side, by two frames provided with two parallel ramps with spray nozzles connected to a high-pressure pump through which water or a cleaning product is supplied. The ramps are covered with protective metal sheets to prevent them from being damaged by the passing animals.

It has been found that the dirt adhering to the animal' hooves is removed completely automatically rapidly and reliably without manual contact by this cleaning method.

This prevents deactivation of the disinfectant which is applied next.

According to the invention, this disinfectant can be applied either in a foot bath located right at the end of the cleaning passageway or by means of a second automatic spray system also located at the end of the cleaning passageway and similar to the automatic spray system for the cleaning product.

Furthermore, the disinfectant can be applied either in liquid form or preferably in the form of a foam which has the advantage of remaining on the animal's skin for longer than a liquid product, and this extends the contact time with the disinfectants and consequently assists destruction of the pathogens on the animal's skin, in particular in the folds of its skin.

A further advantage of the foam is that it is visible so it is possible to ascertain whether all the animals' feet or hooves have been carefully treated.

If the treatment is intended for dairy cows, as is frequently the case, the cleaning passageway as well as the device for applying the disinfectant can preferably be arranged directly before the milking area. The animals therefore inevitably pass through the treatment twice a day, namely prior to the morning milking and prior to the evening milking, and the disinfectant is able to act throughout the milking period to guarantee that all pathogens have been destroyed.

According to a further feature of the invention, the cleaning stage is preceded by a treatment stage in which the dirt adhering to the animals' hooves is pre-softened by moistening or spraying with water or a cleaning product. The preceding stage simplifies removal of this dirt during the cleaning stage; it can also be carried out in a foot bath located directly before the cleaning passageway, or by means of a spray system.

It should also be noted that the cleaning product may be water but preferably consists of a dilute solution of soaps or conventional surface-active agents, in particular non-ionic, cationic or anionic surfactants, optionally mixed with other cleaning products such as phosphates or gluconates. This solution must obviously be selected in such a way that it does not cause skin irritation.

It has surprisingly been found that, according to the invention, certain dilute disinfecting compositions are much more effective than the compositions based on formaldehydes and copper sulphate, providing that the animal's skin has been properly cleaned beforehand to remove all traces of organic dirt. Advantageously, these disinfecting compositions do not pollute the environment and are sufficiently soluble to avoid irritation of the skin.

According to a further feature of the invention, the disinfectant can advantageously contain between 10 and 10,000 mg/l, preferably between 100 and 1,000 mg/l aldehyde originating mainly from the group comprising formaldehyde, glutaraldehyde, glyoxal and mixtures thereof.

These aldehydes may advantageously be combined in a proportion of 10 to 10,000 mg/l, preferably 100 to 1,000 mg/l, with one or a mixture of cationic surfactants originating predominantly from the group comprising aliphatic or heterocyclic quaternary ammonium or phosphonium derivatives comprising at least one long-chain preferably from $C_8$ to $C_{18}$ alkyl group, on their quaternary core. Examples of these compositions include coconut alkylbenzyl dimethylammonium chloride, dioctyl dimethylammonium chloride or else tributyl tetradecylphosphonium chloride.

A further advantageous method involves applying a disinfectant which contains between 100 and 10,000 mg/l, preferably between 500 and 1,000 mg/l, percarboxylic acid originating predominantly from the group comprising peracetic acid, persuccinic acid, perlactic acid, perglutaric acid, peradipic acid, perpropionic acid, performic acid or mixtures thereof.

If the inherent instability of the peracids is allowed for, a disinfectant of this type generally contains between 100 and 100,000 mg/l hydrogen peroxide. It should also be noted that, according to the invention, 10 to 10,000 mg/l anionic surfactants originating predominantly from the group comprising alkylbenzenesulphonic acids, alkylsulphonates or carboxylic acid ethers may preferably be added to the per acids.

It should be pointed out that other disinfectants can also be used without departing from the scope of the invention, such as amines, in particular lauryl propylenetriamine (Lonzabac® 12), in a quantity of 10 to 10,000 mg/l, preferably 100 to 1,000 mg/l, surface-active amphoteric substances such as amide derivatives of $C_{8-18}$ fatty acids having a betaine structure, predominantly glycine derivatives, in particular coconut alkyl dimethylammonium betaine in concentrations between 10 and 10,000 mg/l, preferably between 100 and 1,000 mg/l or additionally surface-active non-ionic surfactants, preferably ethoxylated or propoxylated fatty alcohols as well as oxoalcohols condensed with ethylene oxide and propylene oxide.

Particularly advantageous practical examples of the method according to the invention are illustrated by the following examples.

It is mentioned by way of introduction that, according to the invention, a disinfecting solution is considered to be sufficiently effective if its pathogen content is less than 10,000 /ml after 40 animals have passed through a foot bath containing this solution or if the reduction in the number of pathogens present on the animals' feet or hooves is about 3 log. or higher after passing through this solution.

EXAMPLE 1

40 dairy cows were passed through 40 foot baths containing various disinfectants, on the one hand a disinfectant according to the state of the art and on the other hand four disinfectants A, B, C and D according to the invention, under different conditions, and the reduction in the number of Staphylococcus Aureus on the cows' skin was measured after a contact time of ten minutes at 25° C.

The results obtained are shown in Table 1 below:

TABLE 1

| Test conditions | Disinfectants | Reduction in log. |
| --- | --- | --- |
| Conventional method | formaldehyde 10% copper sulphate 2% | 0.32 to 0.78 |
| Method according to invention with prior cleaning and with a disinfectant provided in liquid form in a foot bath | A) 0.6% formaldehyde +0.4% glutaraldehyde +0.4% benzalkonium chloride | 2.54 to 2.76 |
| | B) 0.1% peracetic acid +0.1% alkylbenzenesulphonic acid | 2.98 to 3.48 |
| | C) 0.1% perlactic acid +0.1% alkylbenzenesulphonic acid +0.05% persuccinic acid +0.05% peradipic acid +0.05% perglutaric acid | 3.26 to 4.02 |
| Method according to invention with prior cleaning and a disinfectant which is applied in the form of foam | D) 0.1% peracetic acid +0.1% alkylbenzenesulphonic acid | 4.24 to 4.78 |

This example clearly confirms the advantages of the method according to the invention over conventional methods without prior cleaning, in particular if the disinfectant is applied as a foam.

EXAMPLE 2

40 cows were passed through a foot bath containing three infection agents according to the state of the art without prior cleaning, and the number of germs surviving in 1 ml of the bath was measured after they had passed through.

The results obtained are shown in Table 2 below:

TABLE 2

| Disinfectant | Germs surviving in the disinfectant solution after 40 cows have passed through the foot bath | |
|---|---|---|
| | aerobic bacteria | bacilli |
| Formaldehyde 5% + Copper sulphate 2% | $10^5$–$10^6$ | $10^5$–$10^6$ |
| Formaldehyde 10% + Copper sulphate 2% | $10^5$–$10^6$ | $10^5$–$10^6$ |
| Copper sulphate 2% | $10^5$–$10^6$ | $10^5$–$10^6$ |

The same experiment was then repeated but was preceded by cleaning of the cows' hooves by automatic spraying with a cleaning product using foot baths containing various cleaning products according to the invention.

The results obtained are shown in Table 3 below.

TABLE 3

| Disinfectant | Germs surviving in the disinfectant solution after 40 cows have passed through the foot bath | |
|---|---|---|
| | aerobic bacteria | bacilli |
| Formaldehyde 0.6% Glutaraldehyde 0.4% Benzalkonium chloride 0.4% | 9000 | 6500 |
| Peracetic acid 0.1% Alkylbenzenesulphonic acid 0.1% | 320 | 230 |
| Perlactic acid 0.1% Perglutaric acid 0.5% Peradipic acid 0.05% Persuccinic acid 0.05% Alkylbenzenesulphonic acid 0.10% | 1800 | 450 |

Comparison of Tables 2 and 3 clearly demonstrates the superiority of the method according to the invention over the method according to the state of the art.

What is claimed is:

1. A method for treating hooves of animals, the method comprising steps of:
    (a) cleaning the animal hooves by applying a cleaning product using an automatic spray system to provide cleaned animal hooves, the cleaning product comprises at least one of:
        (i) water;
        (ii) aqueous soap; and
        (iii) aqueous surfactant; and
    (b) treating the cleaned animal hooves with a disinfectant comprising 10 mg/l to 10,000 mg/l aldehyde obtained from at least one of formaldehyde, glutaraldehyde, glyoxal, and mixtures thereof, wherein the step of treating comprises of at least one of:
        (i) immersion of the cleaned animal hooves in the disinfectant; and
        (ii) spraying the cleaned animal hooves with the disinfectant.

2. A method according to claim 1, wherein the hooves of animals comprise hooves of dairy cows that live in a barn.

3. A method according to claim 1, wherein the step of cleaning the animal hooves comprises removing excrement.

4. A method according to claim 1, wherein the step of cleaning the animal hooves comprises passing the animals through a washing passageway comprising a spray ramp equipped with a row of spray nozzles through which cleaning product is directed at predetermined pressure onto the hooves of the animals to be treated.

5. A method according to claim 4, wherein the washing passageway comprises a spray ramp on both sides of the washing passageway.

6. A method according to claim 1, further comprising a step of pre-softening dirt adhering to the hooves of the animals by immersion or spraying with a cleaning product, wherein the step of pre-softening precedes the step of cleaning.

7. A method according to claim 1, wherein the steps of cleaning and treating occur prior to a step of milking.

8. A method according to claim 1, wherein the disinfectant is provided in the form of foam during the treating step.

9. A method according to claim 1, wherein the disinfectant comprises 100 mg/l to 1,000 mg/l of the aldehyde.

10. A method according to claim 1, wherein the disinfectant further comprises 10 mg/l to 10,000 mg/l cationic surfactant comprising at least one of aliphatic or heterocyclic quaternary ammonium or phosphonium derivatives having at least one $C_8$ to $C_{18}$ alkyl group.

11. A method according to claim 1, wherein the disinfectant further comprises 100 mg/l to 1,000 mg/l cationic surfactant comprising at least one of aliphatic or heterocyclic quaternary ammonium or phosphonium derivatives comprising at least one $C_8$ to $C_{18}$ alkyl group.

12. A method for treating hooves of animals, the method comprising steps of:
    (a) cleaning the animal hooves by applying a cleaning product using an automatic spray system to provide cleaned animal hooves, the cleaning product comprises at least one of:
        (i) water; and
        (ii) aqueous soap; and
        (iii) aqueous surfactant; and
    (b) treating the cleaned animal hooves with a disinfectant comprising 100 mg/l to 10,000 mg/l percarboxylic acid obtained from at least one of peracetic acid, persuccinic acid, perlactic acid, perglutaric acid, peradipic acid, perproprionic acid, performic acid, and mixtures thereof, wherein the step of treating comprises of at least one of:
        (i) immersion of the cleaned animal hooves in the disinfectant; and
        (ii) spraying the cleaned animal hooves with the disinfectant.

13. A method according to claim 12, wherein the hooves of animals comprise hooves of dairy cows that live in a barn.

14. A method according to claim 12, wherein the step of cleaning the animal hooves comprises removing excrement.

15. A method according to claim 12, wherein the step of cleaning the animal hooves comprises passing the animals through a washing passageway comprising a spray ramp equipped with a row of spray nozzles through which cleaning product is directed at predetermined pressure onto the hooves of the animals to be treated.

16. A method according to claim 15, wherein the washing passageway comprises a spray ramp on both sides of the washing passageway.

17. A method according to claim 12, further comprising a step of pre-softening dirt adhering to the hooves of the animals by immersion or spraying with a cleaning product, wherein the step of pre-softening precedes the step of cleaning.

18. A method according to claim 12, wherein the steps of cleaning and treating occur prior to a step of milking.

19. A method according to claim 12, wherein the disinfectant is provided in the form of foam during the treating step.

20. A method according to claim 12, wherein the disinfectant contains 500 mg/l to 1,000 mg/l of the percarboxylic acid.

21. A method according to claim 12, wherein the disinfectant further comprises 10 mg/l to 10,000 mg/l anionic surfactant comprising at least one of alkyl benzene sulphonic acids, alkyl sulphonates, and carboxylic acid ethers.

22. A method for treating hooves of animals, the method comprising steps of:
 (a) cleaning the animal hooves by applying a cleaning product using an automatic spray system to provide cleaned animal hooves, the cleaning product comprises at least one of:
  (i) water; and
  (ii) aqueous soap; and
  (iii) aqueous surfactant; and
 (b) treating the cleaned animal hooves with a disinfectant comprising 100 mg/l to 100,000 mg/l hydrogen peroxide:
  (i) immersion of the cleaned animal hooves in the disinfectant; and
  (ii) spraying the cleaned animal hooves with the disinfectant.

23. A method according to claim 22, wherein the hooves of animals comprise hooves of dairy cows that live in a barn.

24. A method according to claim 22, wherein the step of cleaning the animal hooves comprises removing excrement.

25. A method according to claim 22, wherein the step of cleaning the animal hooves comprises passing the animals through a washing passageway comprising a spray ramp equipped with a row of spray nozzles through which cleaning product is directed at predetermined pressure onto the hooves of the animals to be treated.

26. A method according to claim 25 wherein the washing passageway comprises a spray ramp on both sides of the washing passageway.

27. A method according to claim 22, further comprising a step of pre-softening dirt adhering to the hooves of the animals by immersion or spraying with a cleaning product, wherein the step of pre-softening precedes the step of cleaning.

28. A method according to claim 22, wherein the steps of cleaning and treating occur prior to a step of milking.

29. A method according to claim 22, wherein the disinfectant is provided in the form of foam during the treating step.

30. A method according to claim 22, wherein the disinfectant further comprises 10 mg/l to 10,000 mg/l anionic surfactant selected from at least one of alkyl benzene sulphonic acids, alkyl sulphonates, and carboxylic acid ethers.

* * * * *